United States Patent [19]

Kerr et al.

[11] Patent Number: 5,674,955
[45] Date of Patent: Oct. 7, 1997

[54] PRODUCTION OF POLYISOBUTENES

[75] Inventors: James Maxwell Kerr, Edinburgh; John McMahon, Linlithgow; James Mann Scotland, Stirlingshire, all of Scotland

[73] Assignee: BP Chemicals Limited, London, England

[21] Appl. No.: 396,674

[22] Filed: Mar. 1, 1995

[30] Foreign Application Priority Data

Mar. 7, 1994 [GB] United Kingdom ............ 9404368

[51] Int. Cl.$^6$ ............................... C08F 4/14; C08F 10/08
[52] U.S. Cl. ............... 526/77; 526/221; 526/237; 526/209; 526/290; 526/348.6; 526/348.7; 585/251; 585/253; 585/518
[58] Field of Search .................... 526/77, 237, 290, 526/221, 209, 210, 213; 585/251, 253, 525, 518

[56] References Cited

U.S. PATENT DOCUMENTS

| | | |
|---|---|---|
| 2,775,577 | 12/1956 | Schneider et al. ............ 526/77 |
| 4,152,499 | 5/1979 | Boerzel et al. |
| 4,605,808 | 8/1986 | Samson. |
| 5,068,490 | 11/1991 | Eaton. |
| 5,286,823 | 2/1994 | Rath. |
| 5,416,176 | 5/1995 | Hunt ............................ 526/77 |

FOREIGN PATENT DOCUMENTS

| | | |
|---|---|---|
| 0057510 | 8/1982 | European Pat. Off. . |
| 0489508 | 6/1992 | European Pat. Off. . |
| 2057006 | 3/1981 | United Kingdom . |

OTHER PUBLICATIONS

Supported BF$_3$ catalyst on crystalline polyolefins; carbocationic polymerization of isobutylene, Polymer Bulletin 30, 385–391 (1993) T.C. Chung, A. Kumar, and D. Rhubright.

*Primary Examiner*—Fred Teskin
*Attorney, Agent, or Firm*—Brooks Haidt Haffner & Delahunty

[57] ABSTRACT

This invention relates to a method of producing polyisobutenes from a feedstock comprising a mixture of C4 hydrocarbons and containing isobutene and at least 5% by weight of 1-butene using a cationic polymerisation catalyst, characterised in that prior to polymerisation, the feedstock is subjected to a pre-treatment step in order to reduce the 1-butene content thereof to a level which is at least 20% lower than that of the 1-butene content in the initial mixed C4 hydrocarbon feedstock prior to the pre-treatment thereof and the polyisobutene so formed is (a) very high in its vinylidene group content and (b) substantially free of halogen.

22 Claims, No Drawings

PRODUCTION OF POLYISOBUTENES

This invention relates to an improved method of producing polyisobutenes by cationic polymerisation of a mixed C4 feedstock.

Methods of polymerising isobutene, whether pure or in an isomeric mixture as in a C4 raffinate, using Lewis Acid catalysts are well known and disclosed extensively in prior art. Typical of such catalysts are the halides of aluminium, iron, zinc, titanium, tin, mercury and boron. These catalysts can be optionally used in conjunction with co-catalysts such as e.g. water, alcohol, organic acids, mineral acids, ethers and alkyl halides to enhance catalyst activity. The polymerisation reaction can be carried out in the liquid or gaseous phase, batchwise or continuously, at temperatures ranging from $-100°$ C. to $+100°$ C.

It is also well known that the chain termination step during the polymerisation of isobutene using the aforementioned catalyst systems generally results in a 'final' double bond which imparts a degree of reactivity to the polymer for subsequent reactions, such as epoxidation to form the corresponding epoxide or an addition reaction with maleic anhydride to form the corresponding polyisobutenyl succinic anhydride. However, the termination step, if not properly controlled can result in the final double bond being located either in a relatively less reactive internal position such as 1,2,2-trisubstituted or 1,1,2,2-tetrasubstituted position or in the more desirable, highly reactive terminal 1,1-disubstituted position (hereafter "terminal vinylidene" group) as shown below in each of which R is an alkyl group:

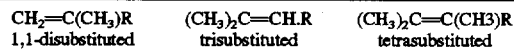

| $CH_2=C(CH_3)R$ | $(CH_3)_2C=CH.R$ | $(CH_3)_2C=C(CH3)R$ |
|---|---|---|
| 1,1-disubstituted | trisubstituted | tetrasubstituted |

In addition to the above, one other problem known to occur during the manufacture of polyisobutene is halogen incorporation from the catalyst(s) used for polymerisation.

In view of the above, it has long been the objective of research in this field to improve the reactivity of the polyisobutene, e.g. its reactivity towards maleic anhydride, by identifying catalyst(s) capable of polymerising isobutene in such a way that the number of terminal vinylidene groups in the polyisobutene is maximised whilst at the same time minimising the amount of halogen incorporated therein. Whilst it is known to take a substantially pure isobutene feed and then polymerise the same, the purification of mixed feeds to isolate a substantially pure isobutene content thereof is relatively cumbersome and expensive and hence is not commercially attractive. Processes are described for using commercially available mixed feeds for this purpose e.g. by Boerzel et. al. in U.S. Pat. No. 4,152,499, Samson in U.S. Pat. No. 4,605,808, Eaton in U.S. Pat. No. 5,068,490, Chung et. al. in "Polymer Bulletin", 30, 385–391 (1993)and Miln et. al. in EP-A-0489508. None of these or other prior art in this field, however, teaches that a polyisobutene having an even higher percentage of terminal vinylidene groups and lower levels of halogen incorporation than hitherto achieved from a mixed C4 hydrocarbon feedstock can be obtained if such feedstock is pre-treated in a particular way to substantially reduce the level of 1-butene content thereof.

One of the objectives of the present invention is to produce, from a given mixed C4 hydrocarbon feedstock, polyisobutenes which exhibit higher reactivity towards, e.g., maleic anhydride which, for example, in the processes described above, would be achieved by obtaining higher terminal vinylidene content than that obtained hitherto from the said feedstock. A further objective of the present invention is to produce from a given feedstock polyisobutenes which have a lower concentration of halogen than that obtained hitherto from said feedstock when using halogenated compounds as catalysts for the cationic polymerization reaction.

Accordingly, the present invention is a method of producing polyisobutenes of Mn 500–5000 as measured by GPC from a feedstock comprising a mixture of C4 hydrocarbons and containing isobutene and at least 5% by weight of 1-butene using a cationic polymerisation catalyst comprising at least one halogenated compound, characterised in that prior to polymerisation, the feedstock is subjected to a pre-treatment step in order to reduce the 1-butene content thereof to a level which is at least 20% lower than that of the 1-butene content in the initial mixed C4 hydrocarbon feedstock prior to the pre-treatment thereof and the polyisobutene so formed (a) has more than 65% of the unsaturated linkages therein as vinylidene groups (i.e. $=CH_2$ groups) and (b) is substantially free of halogen.

For the purposes of the present invention, the expression "pre-treatment" excludes any pre-treatment in which one of more of the hydrocarbon components in the mixed C4 feedstock is converted to an ether such as e.g. conversion of isobutene to methyl tertiary butyl ether followed by back cracking thereof to isobutene which is described in our copending published application No. WO93/21139 (PCT/GB/00823).

The feedstock comprising a mixture of C4 hydrocarbons may be a. a raffinate from the steam cracking process after the selective separation of 1,3-butadiene, the so-called "butadiene raffinate" or "Raffinate I" feedstock, or, b. a hydrocarbon stream obtained during the refining of crude oil comprised primarily of butanes and butenes (hereafter termed "refinery B—B") from catalytic crackers.

Some of these feedstocks can be found e.g. in a book entitled "C4-Hydrocarbons And Derivatives, Resources, Production, Marketing" by Schulze & Homann, published by Springer-Verlag (1989). For instance: Raffinate I has the following components (w/w) of the total composition:

| Component | Raffinate I(%) | Refinery B—B(%) |
|---|---|---|
| Isobutane | 0–5 | 35–45 |
| n-Butane | 4–12 | 7–12 |
| Iso-butene | 35–55 | 10–20 |
| 1-Butene | 15–35 | 9–15 |
| cis/trans-2-Butene | 10–25 | 20–30 |
| 1,3-Butadiene | 0–0.5 | 0–0.5 |

The mixed C4 feedstock is suitably pretreated by subjecting the feedstock to selective hydroisomerisation conditions. The conditions of hydroisomerisation are such that they are sufficient to hydrogenate not only the acetylenic compounds and dienes in the mixed C4 feedstock but are also capable of isomerising 1-butene in the feedstream in the presence of a catalyst. Catalysts that may be used for this hydroisomerisation reaction are suitably e.g. palladium on an alumina support. Such catalysts which are known to function in this manner are commercially available e.g. from Procatalyse Corporation, Sud-Chemie and Calsicat. The concentration of palladium is usually in the range from 0.1–0.5% by weight of the combined total of catalyst and alumina and the surface area of the support is suitably in the range from 20–300 $m^2/g$, preferably from 50–150 $m^2/g$. The broad reaction conditions for hydroisomerisation are described for instance in prior published GB-A-2057006 and these conditions are incorporated herein by reference. Typical conditions for this reaction are:

Pressure—0.1–20 MPa, preferably 500–3000 KPa (5–30 Barg)

Temperature—0°–200° C., preferably from 5°–100° C.

LHSV—0.2–30, preferably 5–30 volumes of hydrocarbon/volume of catalyst/hr

For high butadiene containing feedstocks, two sequential reactors may be necessary, so that hydrogenation of butadiene occurs in the first reactor and isomerisation of 1-butene occurs in the second reactor. Finally, the mole ratio of hydrogen to 1-butene in the feedstock prior to pre-treatment is suitably in the region of 0.01–2.0:1, preferably from 0.1–2.0:1.

The resultant pre-treated product after the hydroisomerisation step has a 1-butene content which is at least 20% lower than that of the initial mixed C4 hydrocarbon feedstock, suitably at least 40% lower and preferably at least 70% lower than that of the initial mixed C4 hydrocarbon feedstock prior to the pre-treatment thereof. This step also eliminates substantially all the acetylenic and diene compounds.

The cationic polymerisation catalyst comprising at least one halogenated compound used for polymerising the pre-treated mixed hydrocarbon feed significantly low in 1-butene is suitably selected from conventional catalysts such as i) $BF_3$ either used
 a. as such, or,
 b. as a complex thereof with with one or more alcohols, carboxylic acids or ethers, particularly ethers having at least one tertiary carbon bound to the oxygen atom of the ether, or,
 c. as (a) or (b) above in combination with a co-catalyst such as an alcohol, ether, organic carboxylic acids or water, or,
 d. deposited as (a), (b) or (c) above on a support such as e.g. silica, alumina and the like;

ii) an ether of the general formula $BF_2.OR"$, or, an alkyl or an aryl derivative of boron fluoride of the general formulae $BF_2R"$, where $R"$ is an alkyl or an aryl group; and iii) tin tetrachloride as such or together with a mineral acid or an alkyl halide as co-catalyst;

Typical examples are (i) tin tetrachloride with e.g. tertiary butyl chloride, and (ii) the complexes of boron trifluoride with an alcohol such as e.g. ethanol, isopropanol or secondary butanol, or, a carboxylic acid such as e.g. formic or acetic acid, or, an ether such as e.g. an alkyl tert-butyl ether in which the alkyl group is selected from methyl, ethyl, propyl, isopropyl, n-butyl and sec-butyl groups. The complexes may either be preformed or formed in situ by the addition of the relevant components separately into the reaction mixture.

The amount of polymerisation catalyst used would be in the range from 0.001 to 10% by weight, preferably from 0.005–10% by weight based on the isobutene content of the feedstock being polymerised.

The polymerisation reaction is suitably carried out at a temperature in the range from −100° C. to +100° C., preferably from −40° C. to +40° C. and a pressure in the range from 10 to 5000 KPa.

The polymerisation reaction is suitably terminated by adding an excess amount of a basic material such as ammonia gas, aqueous ammonium hydroxide solution or aqueous sodium hydroxide solution. Following evaporation of the unreacted C4 monomers, the crude deactivated reaction product is then washed several times with distilled or deionised water in order to remove any remaining inorganic materials. Finally, the crude, washed polymer sample is vacuum distilled in order to remove any light polymer.

A feature of the present invention is that the product produced using the pre-treated C4 feedstock is not only superior in terms of its terminal vinylidene group content e.g. a vinylidene content of >65%, preferably >80%, but said product is also substantially free of halogen, especially if the polymerisation catalyst used is e.g. a boron trifluoride catalyst or a derivative or preformed complex thereof.

By the expression "substantially free of halogen" is meant here and throughout the specification that the polyisobutene has less than 50 ppm of halogen, preferably less than 40 ppm of halogen.

The polyisobutene products of the present invention have a number average molecular weight (Mn) in the range from 500–5000, suitably in the range from 700–3500, typically from 750–3000 as determined by gel permeation chromatography (GPC).

The process of the present invention can be carried out batchwise or continuously.

The process of the present invention is further illustrated with reference to the following Examples.

Example 1

A 1:1 molar complex between $BF_3$ and ethanol was used to carry out a set of batch cationic polymerisation reaction for three different types of feedstreams. These were:

a. a typical Raffinate I feedstream (not according to the invention, see Table 1, Batch 1);

b. a pure isobutene feedstream (diluted in n-butane, not according to the invention, see Table 1, Batch 2); and c. a mixed C4 feedstream low in butadiene and 1-butene (typical of a feedstream obtained if the acetylenes and dienes present in Raffinate I are removed by selective hydrogenation and then about 80% of the 1-butene present is isomerised to cis- and trans- 2-butene; according to the invention, see Table 1, Batch 3).

The reaction conditions used to carry out these polymerisation reactions are listed in Table 2 below and the product properties of the three polymer samples obtained thereby are listed in Table 3 below.

Example 2

A 1:1 molar complex between $BF_3$ and methyl tert-butyl ether was used to carry out a set of batch cationic polymerisation reaction for three different types of feedstreams. These were:

a. a typical Raffinate I feedstream (not according to the invention, see Table 4, Batch 4);

b. a pure isobutene feedstream (diluted in n-butane, not according to the invention, see Table 4, Batch 5); and c. a mixed C4 feedstream low in butadiene and 1-butene (typical of a feedstream obtained if the acetylenes and dienes present in Raffinate I are removed by selective hydrogenation and then about 80% of the 1-butene present is isomerised to cis- and trans- 2-butene; according to the invention, see Table 4, Batch 6).

The reaction conditions used to carry out these polymerisation reactions are listed in Table 5 below and the product properties of the three polymer samples obtained thereby are listed in Table 6 below.

Example 3

A 1:1 molar complex between $BF_3$ and water was used to carry out a set of batch cationic polymerisation reaction for three different types of feedstreams. These were:

a. a typical Raffinate I feedstream (not according to the invention, see Table 4, Batch 7);
b. a pure isobutene feedstream (diluted in n-butane, not according to the invention, see Table 4, Batch 8); and
c. a mixed C4 feedstream low in butadiene and 1-butene (typical of a feedstream obtained if the acetylenes and dienes present in Raffinate I are removed by selective hydrogenation and then about 80% of the 1-butene present is isomerised to cis- and trans- 2-butene; according to the invention, see Table 4, Batch 9).

The reaction conditions used to carry out these polymerisation reactions are listed in Table 5 below and the product properties of the three polymer samples obtained thereby are listed in Table 6 below.

TABLE 1

| | FEEDSTOCK COMPOSITION | | | | | | |
|---|---|---|---|---|---|---|---|
| Batch No. | Iso-butene % | n-Butane % | Iso-butane % | 1-Butene % | trans-2-Butene % | cis-2-Butene % | 1,3-Butadiene % |
| 1 | 42.33 | 17.52 | 5.59 | 21.68 | 7.35 | 5.34 | 660 |
| 2 | 46.06 | 53.68 | 0.00 | 0.00 | 0.00 | 0.00 | 0 |
| 3 | 45.23 | 25.89 | 0.16 | 4.38 | 14.39 | 9.90 | 36 |

TABLE 2

| Batch No. | Conc. of $BF_3$.Ethanol Complex(g) per Kg of C4 Blend | Weight of C4 Blend (g) | Starting Temp °C. | Maximum Temp °C. | Reaction Time (Minutes) |
|---|---|---|---|---|---|
| 1 | 1.900 | 358.1 | −15.4 | −1.6 | 20 |
| 2 | 1.725 | 307.2 | −11.5 | 2.5 | 21 |
| 3 | 1.825 | 306.8 | −15.3 | 1.4 | 20 |

TABLE 3

| Batch No. | Vinylidene Content % (by I.R.) | Mn by GPC | Organic Fluorine (ppm) |
|---|---|---|---|
| 1 | 75.3 | 1001 | 62.0 |
| 2 | 82.3 | 1220 | 3.5 |
| 3 | 79.3 | 942 | 17.0 |

TABLE 4

| | FEEDSTOCK COMPOSITION | | | | | | |
|---|---|---|---|---|---|---|---|
| Batch No. | Iso-butene % | n-Butane % | Iso-butane % | 1-Butene % | trans-2-Butene % | cis-2-Butene % | 1,3-Butadiene % |
| 4 | 42.50 | 16.20 | 5.00 | 22.10 | 8.60 | 5.50 | 400 |
| 5 | 46.06 | 53.68 | 0.00 | 0.00 | 0.00 | 0.00 | 0 |
| 6 | 45.23 | 25.89 | 0.16 | 4.38 | 14.39 | 9.90 | 36 |
| 7 | 42.50 | 16.20 | 5.00 | 22.10 | 8.60 | 5.50 | 400 |
| 8 | 40.13 | 59.52 | 0.32 | 0.00 | 0.00 | 0.00 | 0 |
| 9 | 45.23 | 25.89 | 0.16 | 4.38 | 14.39 | 9.90 | 36 |

TABLE 5

| Batch No. | Conc. of Initiator (g) per Kg of C4 Blend | Weight of C4 Blend (g) | Starting Temp °C. | Maximum Temp °C. | Reaction Time (Minutes) |
|---|---|---|---|---|---|
| 4* | 1.35 | 229.3 | −10.0 | −3.0 | 30 |
| 5* | 1.24 | 258.2 | −12.9 | −1.4 | 30 |

TABLE 5-continued

| Batch No. | Conc. of Initiator (g) per Kg of C4 Blend | Weight of C4 Blend (g) | Starting Temp °C. | Maximum Temp °C. | Reaction Time (Minutes) |
|---|---|---|---|---|---|
| 6* | 1.23 | 333.2 | −14.5 | −0.2 | 20 |
| 7** | 1.59 | 207.5 | −10.8 | −7.5 | 20 |
| 8** | 1.44 | 332.6 | −13.7 | −8.2 | 20 |
| 9** | 1.41 | 424.3 | −13.2 | −7.5 | 20 |

TABLE 6

| Batch No. | Vinylidene Content % (by I.R.) | Mn by GPC | Organic Fluorine (ppm) |
|---|---|---|---|
| 4* | 74.0 | 1203 | 99 |
| 5* | 85.0 | 1049 | 2 |
| 6* | 82.0 | 866 | 32 |
| 7** | 59.0 | 671 | 280 |
| 8** | 80.0 | 743 | 7 |
| 9** | 69.0 | 637 | 23 |

*Batches 4–6 made using $BF_3$.methyl tert-butyl ether complex as initiator
**Batches 7–9 made using $BF_3$.water complex as initiator Example 4

A 1:1 molar complex of boron trifluoride and ethanol was used to carry out a series of continuous cationic polymerisations of three different feedstocks, namely: a Raffinate I (not according to the invention); a pure iso-butene feedstock (diluted in butanes, not according to the invention); and a hydroisomerized Raffinate I, hydroisomerized over a supported palladium catalyst (0.3% Pd on alumina, grade ESU 144, ex Calsicat) at a pressure of 2500 KPa (25 barg), at 40° C. and an LHSV of 20–30 vols of hydrocarbon/volume of catalyst/hr. The composition in weight % of each of these feedstocks is shown in Table 7 below:

TABLE 7

| Component | Raffinate I (IB) | Pure Iso-butene (IB) | Hydroisomerized Raffinate I (HI) |
|---|---|---|---|
| Butanes | 33.3 | 60 | 36.5 |
| trans-Butene-2 | 7.5 | — | 16.4 |
| Butene-1 | 19.1 | — | 3.9 |
| iso-Butene | 36.4 | 40 | 35.3 |
| cis-Butene-2 | 3.5 | — | 7.8 |
| 1,3-Butadiene | 0.04 | — | — |

In each case the 1:1 boron trifluoride-ethanol complex was added neat to the reaction with a metering pump. After a specified contact time, each reaction was terminated by using an excess of propylamine in heptane which was added to a product collection point. Following termination, each crude de-activated reaction product was cleaned by washing initially with aqueous ammonia solution followed by water washing (3 times). The resultant washed product was allowed to separate into aqueous and an organic heptane phases. The heptane phase containing the product polymer was then separated, dried over anhydrous magnesium sulphate, filtered and vacuum distilled to remove any light polymer. The reaction conditions and the properties of the products formed for each of the samples prepared from these feedstocks is shown in Table 8 below.

TABLE 8

| Feed | Reaction Time (Mins) | Reaction Temp (°C.) | Cat conc. g/Kg C4 Blend | Mn of Product (by GPC) | Vinylidene Content(by IR) | Fluorine Content (ppm) |
|---|---|---|---|---|---|---|
| IB | 15 | −10 | 1.31 | 721 | 84 | <10 |
| HI | 14 | −10 | 1.82 | 791 | 86 | 34 |
| RI | 18 | −13 | 0.98 | 812 | 77 | 81 |
| IB | 15 | −13 | 0.98 | 969 | 88 | <10 |
| HI | 15 | −15 | 1.53 | 1063 | 81 | 23 |
| RI | 10 | −10 | 0.98 | 910 | 75 | 58 |
| IB | 18 | −13 | 0.98 | 1376 | 85 | <10 |
| HI | 18 | −13 | 1.26 | 1414 | 80 | 14 |
| RI | 15 | −13 | 0.98 | 1302 | 75 | 61 |
| IB | 20 | −15 | 0.79 | 1586 | 85 | <10 |
| HI | 27 | −13 | 1.41 | 1510 | 83 | 22 |
| RI | 15 | −10 | 1.64 | 1429 | 78 | 58 |

We claim:

1. A method of producing polyisobutenes having a number average molecular weight (Mn) in the range from 500–5000 as measured by GPC from a feedstock comprising a mixture of C4 hydrocarbons and containing isobutene and at least 5% by weight of 1-butene using a cationic polymerisation catalyst comprising at least one halogenated compound, characterised in that prior to polymerisation, the feedstock is subjected to a pre-treatment step in order to reduce the 1-butene content thereof to a level which is at least 20% lower than that of the 1-butene content in the initial mixed C4 hydrocarbon feedstock prior to the pre-treatment thereof and the polyisobutene so formed (a) has more than 65% of the unsaturated linkages therein as vinylidene groups and (b) is substantially free of halogen.

2. A method according to claim 1 wherein the feedstock comprising a mixture of $C_4$ hydrocarbons is a raffinate from a steam cracking process after the separation of 1,3-butadiene or a hydrocarbon stream obtained during the refining of crude oil and comprised primarily of butanes and butenes.

3. A method according to claim 2 wherein the feedstock is a Raffinate I or a Refinery B—B stream having the following composition by weight of the total composition:

| Component | Raffinate I(%) | Refinery B—B(%) |
|---|---|---|
| Isobutane | 0–5 | 35–45 |
| n-Butane | 4–12 | 7–12 |
| Iso-butene | 35–55 | 10–20 |
| 1-Butene | 15–35 | 9–15 |
| cis/trans-2-Butene | 10–25 | 20–30 |
| 1,3-Butadiene | 0–0.5 | 0–0.5 |

4. A method according to claim 1 wherein the mixed C4 feedstock is pretreated by subjecting the feedstock to selective hydroisomerisation conditions in the presence of a catalyst.

5. A method according to claim 4 wherein the conditions of catalytic hydroisomerisation are such that they are not only sufficient to hydrogenate the acetylenic compounds and the dienes in the mixed C4 feedstock but are also capable of isomerising 1-butene in the feedstream.

6. A method according to claim 4 wherein the catalyst used for this hydroisomerisation reaction is palladium on an alumina support.

7. A method according to claim 6 wherein the concentration of palladium in the catalyst is in the range from 0.1–0.5% by weight of the combined total of catalyst and alumina support.

8. A method according to claim 6 wherein the surface area of the alumina support is in the range from 20–300 $m^2/g$.

9. A method according to claim 4 wherein the hydroisomerisation is carried out at a pressure in the range from 0.1–20 MPa absolute, a temperature in the range from 0°–250° C., and an LHSV in the range from 0.2–30 volumes of hydrocarbon/volume of catalyst/hour.

10. A method according to claim 1 wherein the mixed C4 feedstock prior to the pre-treatment is rich in butadiene and said feedstock is pre-treated sequentially in two reactors so that hydrogenation of butadiene occurs in the first reactor and isomerisation of 1-butene occurs in the second reactor.

11. A method according to claim 1 wherein the mole ratio of hydrogen to 1-butene in the mixed feedstock prior to pre-treatment is in the range of from 0.01–2.0:1.

12. A method according to claim 5 wherein the pre-treated product after the hydrogenation and isomerisation steps has a 1-butene content which is at least 40% lower than that of the initial mixed C4 hydrocarbon feedstock and is substantially free of all acetylenic and diene compounds.

13. A method according to claim 1 wherein the cationic polymerization catalyst used for polymerizing the pre-treated mixed hydrocarbon feedstock significantly low in 1-butene content is any of the catalysts selected from the following group:

(i) $BF_3$; (ii) a complex of $BF_3$ with one or more alcohols, carboxylic acids, or ethers; (iii) a combination of (i) or (ii) and a co-catalyst; (iv) any of (i), (ii), or (iii) deposited on a support; (v) an ether of boron fluoride of the general formula $BF_2OR''$, where R'' is an alkyl or aryl group; (vi) an alkyl or an aryl derivative of boron fluoride of the formula $BF_2R''$ where R'' has the same meaning as given before; (vii) tin tetrachloride; (viii) tin tetrachloride together with a mineral acid or an alkyl halide co-catalyst.

14. A method according to claim 13 wherein the catalyst comprises a complex of boron trifluoride with ethanol, isopropanol or secondary butanol, or, formic or acetic acid, or, alkyl tert-butyl ether wherein the alkyl group is selected from the group consisting of methyl, ethyl, propyl, isopropyl, n-butyl, and sec-butyl groups.

15. A method according to claim 14 wherein the complex is either preformed or formed in situ by the addition of the relevant components separately into the reaction mixture.

16. A method according to claim 13 wherein the complex of $BF_3$ is with an ether having at least one tertiary carbon bound to the oxygen atom of the ether.

17. A method according to claim 1 wherein the amount of cationic polymerisation catalyst used is in the range from 0.001 to 10% by weight based on the isobutene content of the feedstock being polymerised.

18. A method according to claim 1 wherein the polymerisation reaction is carried out at a temperature in the range from –100° C. to +100° C. and a pressure in the range from 10 to 5000 KPa absolute.

19. A method according to claim 1 wherein the polymerisation reaction is terminated by adding an excess amount of a basic material to the reaction mixture.

20. A method according to claim 18 wherein the basic material used for termination of the polymerization reaction is selected from ammonia gas, aqueous ammonium hydroxide solution and aqueous sodium hydroxide solution.

21. A method according to claim 1 wherein the polyisobutene produced using the pre-treated C4 feedstock has a terminal vinylidene group content of at least 80% and a halogen content of less than 40 ppm.

22. A method according to claim 1 wherein said method is carried out batchwise or continuously.

* * * * *

UNITED STATES PATENT AND TRADEMARK OFFICE
CERTIFICATE OF CORRECTION

PATENT NO.  : 5,674,955
DATED       : October 7, 1997
INVENTOR(S) : JAMES M. KERR, JOHN McMAHON and JAMES M. SCOTLAND It is certified that error appears in the above-indentified patent and that said Letters Patent is hereby corrected as shown below:

Col. 6, Table 2, Batch No. 1, under the column headed "Maximum Temp C", change "-1.6" to --1.5--

Col. 7, Table 7, the designation under the column headed "Raffinate I" should read --(RI)-- not "(IB)"

Signed and Sealed this

Twentieth Day of January, 1998

Attest:

BRUCE LEHMAN

Attesting Officer

Commissioner of Patents and Trademarks